UNITED STATES PATENT OFFICE 2,623,067

PREPARATION OF BETA-SUBSTITUTED ACRYLIC ACIDS

Warren L. Beears, Cleveland, and Jacob Eden Jansen, Akron, Ohio, assignors to The B. F. Goodrich Company, New York, N. Y., a corporation of New York No Drawing. Application January 10, 1950, Serial No. 137,885

6 Claims. (Cl. 260—526)

This invention relates to the preparation of beta-substituted acrylic acids, and pertains more particularly to the preparation of such acids by the catalytic rearrangement of beta-lactones.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner, beta-propiolactone is obtained from ketene and formaldehyde; beta-isovalerolactone (or beta-beta-dimethyl propiolactone) is obtained from ketene and acetone; beta-butyrolactone is obtained from ketene and acetaldehyde; gamma-methyl-beta-valerolactone is obtained from ketene and isobutyraldehyde; and other beta-lactones are obtained by reacting still other aldehydes and ketones with ketenes.

We have now discovered that beta-lactones having at least one alkyl substituent attached to the beta carbon atom undergo molecular rearrangement in the presence of sulfuric acid to form beta-substituted acrylic acids. This peculiar rearrangement is represented by the following equation:

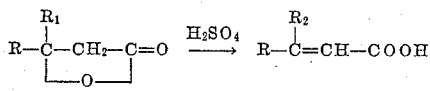

wherein R is an alkyl radical, preferably containing from 1 to 4 carbon atoms, and $R_1$ is a member of the class consisting of hydrogen and alkyl radicals, preferably those alkyl radicals containing from 1 to 4 carbon atoms.

It is quite surprising that beta-substituted beta-lactones of the above structure will rearrange in the manner shown, since beta-propiolactone, the simplest possible beta-lactone, undergoes no such rearrangement, but instead polymerizes in the presence of sulfuric acid to a material which must be pyrolyzed if it is desired to obtain acrylic acid.

Beta-lactones which possess the structure

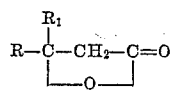

wherein R and $R_1$ have the significance described hereinabove, and undergo the rearrangement to form beta-substituted acrylic acids include beta-butyrolactone, beta-valerolactone, beta-caprolactone, beta-methyl-beta-valerolactone, beta, beta-dimethyl-beta-propiolactone, beta, beta-dipropyl-beta-propiolactone, beta-butyl-beta-propiolactone, beta, beta-dibutyl-beta-propiolactone, beta-hexyl-beta-propiolactone, gamma-methyl - beta - caprolactone, gamma - ethyl-beta-caprolactone, and the like.

The concentrated sulfuric acid of commerce is preferably utilized in the rearrangement of beta-lactones, although other sulfuric acid concentrations may be utilized with but small decrease in yield of the desired product. The quantity of sulfuric acid utilized is not critical and may be varied considerably. In general, however, it may be stated that highest yields of the beta-substituted acrylic acids are obtained when from 8 to 15% by weight of sulfuric acid, based on the weight of the beta-lactone, is employed.

The rearrangement process of this invention may be carried out in any desired manner. For example, one preferred method consists in adding the beta-lactone to the sulfuric acid in an open reactor and at room temperature. The reaction tends to be exothermic and the temperature of the mixture consequently rises considerably. On cooling, the beta-substituted acrylic acid precipitates and may be separated from the reaction mixture by filtering or other conventional separation means. The purity of the product is greatly increased by washing the crude acid with a liquid hydrocarbon such as hexane or the like.

Alternatively, the process may be carried out by adding the acid to the beta-lactone. Also, an organic solvent for the beta-lactone, for example, aromatic hydrocarbons such as benzene and toluene, or ethers such as diethyl ether or 1,4-dioxane, may be advantageously utilized.

The invention is further illustrated by the following examples, wherein all parts are by weight.

*Example I*

0.3 part of concentrated sulfuric acid is added to a solution of 2 parts of beta, beta-dimethyl-beta-propiolactone in 2 parts of benzene. The solution becomes warm and on cooling to room temperature solid dimethylacrylic acid (M. P. 68–69° C.) precipitates from the solution.

*Example II*

10 parts of beta, beta-dimethyl-beta-propiolactone are added to 1.5 parts of concentrated sulfuric acid in an open reactor. The mixture becomes quite hot and on cooling dimethylacrylic acid precipitates. The solid acid is washed 5 times with hot hexane and 8 parts (80%) of substantially pure dimethylacrylic acid are obtained.

Example III

Beta, beta - dimethyl - beta - propiolactone is added to concentrated sulfuric acid in the following proportions in three separate reactors:

a. 33 parts lactone to 4.5 parts acid
b. 60 parts lactone to 9.0 parts acid
c. 100 parts lactone to 13.5 parts acid.

The solid acid obtained in each reactor is combined and mixed with hot hexane to give two liquid phases and the upper layer is decanted. This extraction is repeated 5 times and on cooling to about 0° C. 168 parts (89% of theory) of dimethylacrylic acid are recovered.

When the above examples are repeated utilizing other weight percentages of sulfuric acid, the yields of acid obtained are in general equivalent or slightly lower than those obtained in the examples. Also when other of the beta-lactones disclosed hereinabove are employed, excellent yields of the corresponding acrylic acid are obtained. For example, beta-methyl-acrylic acid is obtained from beta-butyrolactone, dibutyl-acrylic acid is obtained from beta, beta-dibutyl-beta-propiolactone, and beta-isopropyl acrylic acid is obtained from gamma-methyl beta-valerolactone.

The beta-substituted acrylic acids obtained by the process of this invention are useful polymerizable compounds either as the free acids or in the form of the acid esters. The acids are also useful as chemical intermediates and for many other purposes.

Although specific examples of the invention have been herein disclosed, it is not intended to limit the invention thereto, but to include all the variations and modifications falling within the spirit and scope of the appended claims.

We claim:

1. The method which comprises bringing together a beta-lactone of the formula

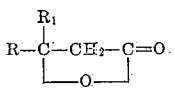

wherein R is an alkyl radical and $R_1$ is a member of the class consisting of hydrogen and alkyl, and sulfuric acid, whereupon molecular rearrangement of said beta-lactone occurs to form a beta-substituted acrylic acid of the formula

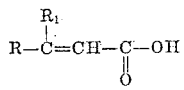

wherein R and $R_1$ have the same significance as above.

2. The method which comprises bringing together a beta-lactone of the formula

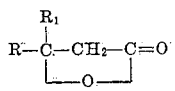

wherein R is an alkyl radical containing from 1 to 4 carbon atoms and $R_1$ is a member of the class consisting of hydrogen and alkyl radicals containing from 1 to 4 carbon atoms, and sulfuric acid, whereupon molecular rearrangement of said beta-lactone occurs to form a beta-substituted acrylic acid of the formula

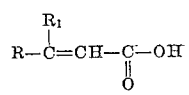

wherein R and $R_1$ have the same significance as above, and separating said beta-substituted acrylic acid from the reaction mixture.

3. The method which comprises bringing together a beta-lactone of the formula

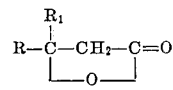

wherein R is an alkyl radical containing from 1 to 4 carbon atoms and $R_1$ is a member of the class consisting of hydrogen and alkyl radicals containing from 1 to 4 carbon atoms, and from 8% to 15% by weight, based on the weight of said beta-lactone, of sulfuric acid, whereupon molecular rearrangement of said beta-lactone occurs to form a beta-substituted acrylic acid of the formula

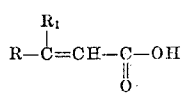

wherein R and $R_1$ have the same significance as above, and separating said beta-substituted acrylic acid from the reaction mixture.

4. The method which comprises bringing together a beta-lactone of the formula

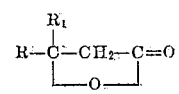

wherein R is an alkyl radical containing from 1 to 4 carbon atoms and $R_1$ is a member of the class consisting of hydrogen and alkyl radicals containing from 1 to 4 carbon atoms, and from 8% to 15% by weight, based on the weight of the beta-lactone, of concentrated sulfuric acid, whereupon molecular rearrangement of said beta-lactone occurs to form a beta-substituted acrylic acid of the formula

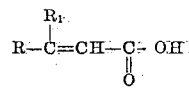

wherein R and $R_1$ have the same significance as above, and separating said beta-substituted acrylic acid from the reaction mixture.

5. The method of claim 4 wherein the beta-lactone employed is beta-dimethyl-beta-propiolactone, the beta-substituted acrylic acid recovered being dimethylacrylic acid.

6. The method which comprises adding beta, beta-dimethyl-beta-propiolactone to from 8% to 15% by weight, based on the weight of said beta-lactone, of concentrated sulfuric acid, whereupon molecular rearrangement of said beta-lactone occurs to form dimethylacrylic acid and separating said dimethylacrylic acid from the reaction mixture.

WARREN L. BEEARS.
JACOB EDEN JANSEN.

REFERENCES CITED

The following references are of record in the file of this patent:

UNITED STATES PATENTS

| Number | Name | Date |
|---|---|---|
| 2,361,036 | Kung | Oct. 24, 1944 |
| 2,469,701 | Redmon | May 10, 1949 |
| 2,484,067 | Boese | Oct. 11, 1949 |

FOREIGN PATENTS

| Number | Country | Date |
|---|---|---|
| 579,839 | Great Britain | July 25, 1945 |